United States Patent [19]

Wada et al.

[11] Patent Number: 4,855,854

[45] Date of Patent: Aug. 8, 1989

[54] THIN-FILM MAGNETIC HEAD

[75] Inventors: Toshiaki Wada; Akio Murata, both of Osaka, Japan

[73] Assignee: Sumitomo Special Metal Co., Ltd., Osaka, Japan

[21] Appl. No.: 248,289

[22] Filed: Sep. 22, 1988

Related U.S. Application Data

[63] Continuation-in-part of Ser. No. 37,682, Apr. 13, 1987, abandoned.

[30] Foreign Application Priority Data

Feb. 9, 1987 [JP] Japan ............................. 62-28694

[51] Int. Cl.$^4$ ..................... G11B 5/147; H01F 7/06
[52] U.S. Cl. ........................................ 360/126; 29/603
[58] Field of Search ............................ 360/126; 29/603

[56] References Cited

U.S. PATENT DOCUMENTS

| | | | |
|---|---|---|---|
| 4,490,760 | 12/1984 | Kamimaka | 360/126 |
| 4,651,248 | 3/1987 | Shiiki | 360/126 |
| 4,685,014 | 8/1987 | Hanazono | 360/126 |
| 4,745,506 | 5/1988 | Nakamura | 360/126 X |

Primary Examiner—A. J. Heinz
Attorney, Agent, or Firm—Watson, Cole, Grindle & Watson

[57] ABSTRACT

A thin-film, perpendicular magnetic head includes a magnetic recording and reproducing substrate having a mechanochemically polished principal surface that includes a plurality of grooves filled with a nonmagnetic material; a thin-film conducting coil located on the polished surface of the substrate; an insulating layer of inorganic oxide covering the conductor coil and the polished principle surface of the magnetic substrate, this insulating layer including a via hole formed therein and having an exposed surface which is mechanochemically polished; a thin-film main pole on the polished surface of the insulating layer; and a protective overcoat covering the main pole.

20 Claims, 2 Drawing Sheets

THIN-FILM MAGNETIC HEAD

This is a continuation-in-part of application Ser. No. 37,682, filed Apr. 13, 1987, abandoned.

BACKGROUND OF THE INVENTION

1. Field of the invention

This invention relates to a thin-film, perpendicular magnetic recording and reproducing head.

2. Description of the prior art

Thin-film, perpendicular magnetic recording and reproducing heads have a high frequency response, and due to advances in semiconductor technology, highly accurate thin-film magnetic heads can be manufactured at a low cost. It is expected that they will soon be used more commonly than any other type of presently known magnetic head.

Thin-film, perpendicular magnetic recording and reproducing heads are generally classified into inductive heads, which are used for recording and reproducing purposes, and magnetic resistance heads, which are used for reproducing purposes. An inductive head comprises a magnetic substrate which is formed from, e.g., soft ferrite; an insulating layer provided on the magnetic substrate, this insulating layer containing a thin-film conductor; a main pole provided on the insulating layer and formed from, e.g., Permalloy, Sendust or a amorphous alloy; and a protective overcoat covering the main pole. These thin-film, perpendicular magnetic recording and reproducing heads are usually manufactured by a process as follows:

(a) Forming a plurality of grooves in a predetermined pattern in a principal surface of a magnetic material, filling these grooves with a nonmagnetic material, such as glass, $SiO_2$, $Al_2O_3$ or barium titanate, and then finely polishing the principal surface of the so-formed magnetic substrate.

(b) Forming a thin-film conductor coil on the polished principal surface of the magnetic substrate, and then forming an insulating layer on the magnetic substrate and the conductor coil, the insulating layer consisting of a film of either an organic material such as a resist or polyamide, or an inorganic oxide such as $SiO_2$.

(c) Flattening the exposed surface of the insulating layer which is uneven (it will have an uneven surface due to the presence of the conductor coil on the magnetic substrate) by an etchback method employing a resist, which is described, for example, in Technical Report US 86-13 of the Institute of Electrical Communication Engineers of Japan.

(d) Forming a via hole in the insulating layer so as to provide for magnetic contact between a subsequently formed main pole and the magnetic substrate.

(e) Forming a main pole on the surface of the insulating layer and the exposed surface of the magnetic substrate, and after subsequently forming a magnetic film and a protective overcoat on the main pole, cutting the assembly to a predetermined size and then polishing it.

The magnetic properties of the main pole in the thin-film, perpendicular magnetic recording and reproducing head manufactured as just described usually depend on the nature of the surfaces of the insulating layer and the magnetic substrate, including roughness and residual stress. Unfortunately, the etchback method is not effective for satisfactorily flattening the surface of the insulating layer, e.g., when it is composed of an inorganic oxide. As such, it is difficult to obtain a uniform wafer surface by this method. Moreover, it is an inefficient method because it requires a great deal of labor and time.

In addition to the foregoing, the insulating layer has a projecting edge along the surface thereof adjacent to the via hole. As such, that portion of the main pole which covers the projecting edge of the insulating layer will have a reduced and nonuniform film thickness, which lowers the magnetic properties of the main pole and thereby the performance of the magnetic head as a whole.

SUMMARY OF THE INVENTION

It is, therefore, an object of the present invention to provide a thin-film, perpendicular magnetic recording and reproducing head of improved magnetic properties which is free from the noted problems of the prior art thin-film magnetic heads, including unevenness in the surface of the insulating layer and the presence of a projecting edge of the insulating layer adjacent the via hole, and which can be manufactured efficiently by a simple process.

This object is essentially attained by a magnetic head comprising a magnetic substrate having a mechanochemically polished principal surface, this principal surface including a plurality of grooves which are filled with a non-magnetic material; a thin-film conductor coil located on the polished surface of the magnetic substrate; an insulating layer of an inorganic oxide covering the polished surface of the magnetic substrate and the conductor coil thereon, the insulating layer including a via hole formed therein and having its exposed surface mechanochemically polished so as to be extremely smooth and rounded at the location where it merges with the via hole therein, the via hole exposing a surface portion of the principal surface of the magnetic substrate; a main pole located on the polished surface of the insulating layer and the exposed surface portion of the principal surface of the magnetic substrate; and a protective overcoat covering the main pole. Therefore, an exposed end face of the thin-film magnetic head opposite a magnetic recording medium is composed of the magnetic substrate for forming the via hole, the non-magnetic material filled in the groove in the principal surface of the magnetic substrate, the insulating layer covering the conductor coil, the first main pole and the protective overcoat. An electrode terminal is formed in the conventional manner.

The main pole may be composed of a thin film. Another main pole composed of a thick film can be located between this thin-film main pole and the protective overcoat. The thin-film main pole has a coercive force and a permeability which are drastically improved over its counterpart in any conventional thin-film head. Therefore, the head of this invention exhibits a recording density $D_{50}$ (which corresponds to 50% of the output voltage at a low recording density of 1 kBPI) which is 1.7 times higher than that of any conventional thin-film head, while also showing a high reproducing output voltage over a whole range.

Other features and advantages of this invention will become apparent from the following detailed description and the accompanying drawings.

DETAILED DESCRIPTION OF THE INVENTION

Figure 1:
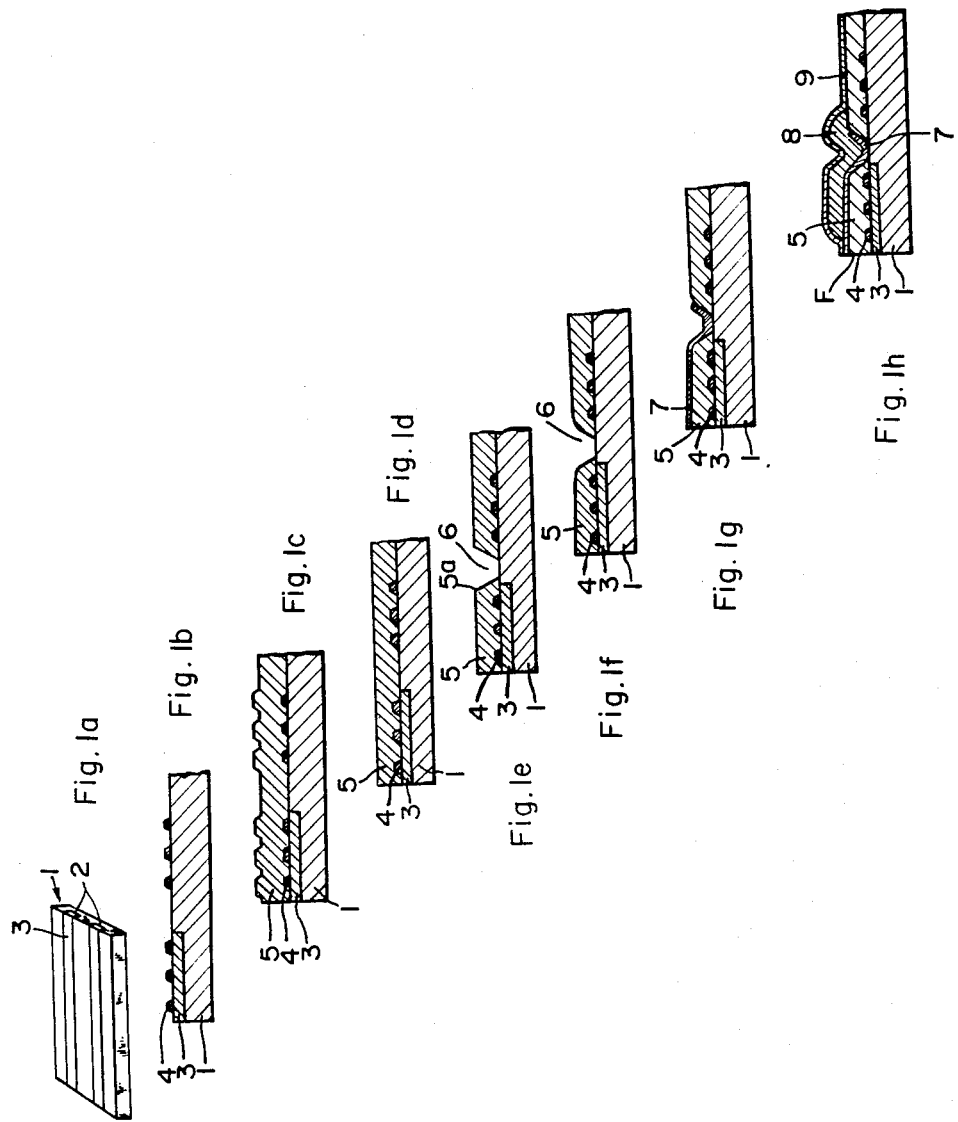
FIGS. 1a–1h are a series of views illustrating a process for manufacturing a thin-film, perpendicular magnetic recording and reproducing head according to the present invention, FIG. 1a showing a perspective view of the magnetic substrate which is used in the process and FIGS. 1b-1h showing enlarged end views of a portion of the magnetic substrate shown in FIG. 1a and the elements of the thin-film magnetic head sequentially formed thereon.

A process which can be used for manufacturing a thin-film magnetic head embodying this invention is shown by way of example in FIGS. 1a-1h. The head includes a magnetic substrate formed from Ni-Zn ferrite (ferrite containing Ni and Zn). The process comprises a series of steps as follows:

(1) Forming a plurality of grooves 2 in a predetermined pattern on a principal surface of a magnetic material, then filling the grooves 2 with a nonmagnetic material 3, such as glass, $SiO_2$, $Al_2O_3$ or barium titanate, and then mechanochemically polishing the principal surface of the so-formed magnetic substrate 1;

(2) Forming a thin-film conductor coil 4, e.g., of copper or aluminum, on the polished principal surface of the magnetic substrate 1;

(3) Forming an insulating layer 5, which is composed of an inorganic oxide such as $SiO_2$ or $Al_2O_3$, on the conductor coil 4 by sputtering or other suitable technique to provide electrical insulation between the conductor coil 4 and a main pole 7 (which will hereinafter be described);

(4) Flattening the surface of the insulating layer 5 to a roughness not exceeding 500 Å by finely polishing it, for example, using a diamond grinding technique, to remove its unevenness, which is due to the presence of the conductor coil 4 in the insulating layer 5;

(5) Forming a via hole 6 in the insulating layer 5, for example, by ion beam or chemical etching, to expose a surface portion of the principal surface of the magnetic substrate 1 and thus provide a magnetic contact between a subsequently formed main pole 7 and the magnetic substrate 1;

(6) Mechanochemically polishing the exposed surface of the insulating layer 5 (including the edge 5a of the layer 5 defining the periphery of the via hole 6 and the exposed surface portion of the principal surface of the magnetic substrate 1 to remove any stresses therefrom and to bevel the edge 5a until the layer 5 has a surface roughness not exceeding 100 Å, or preferably not exceeding 40 Å, while the magnetic substrate 1 has a surface roughness not exceeding 100 Å, so that all of those surfaces may be free from any distortion;

(7) Forming a first main pole 7 on the polished surface of the insulating layer 5 and the polished surface of the principal surface of the magnetic substrate 1, for example, from an iron alloy such as Permalloy or Sendust or an amorphous alloy, by sputtering, vapor deposition, plating, or other suitable technique;

(8) Forming a second, thick-film main pole 8 on the main pole 7 by sputtering, pattern plating, vapor deposition or other suitable technique to prevent its magnetic saturation; and (9) Forming a protective overcoat 9 over the second main pole 8.

The thus produced thin-film magnetic head of the present invention has an exposed end face F opposite the magnetic recording medium, the end face being composed of the magnetic substrate for forming the via hole, the non-magnetic material filled in the groove in the principal surface of the magnetic substrate, the insulating layer covering the conducted coil, the first main pole and the protective overcoat.

By the inventive process the exposed surfaces of the magnetic substrate 1 and the insulating layer 5 are relieved from any distortion and the edge 5a of the insulating layer adjacent the via hole 6 is appropriately rounded. Those surfaces will have a high and uniform degree of smoothness, and the first main pole 7 formed thereon will have improved magnetic properties.

If the second, thick-film main pole 8 is formed by pattern etching, it is useful to provide a protective film of an inorganic oxide on the first main pole 7 to prevent its etching.

The magnetic substrate may also be formed from Mn-Zn ferrite (ferrite containing MnO and ZnO. In this case, it is necessary to provide an insulating layer between the substrate and the thin-film conductor coil, as the Mn-Zn ferrite is an electrically-conductive material.

The mechanochemical polishing of the surface after its diamond polishing, as stated at (4) and (6) above, is very effective for removing its roughness and distortion, as compared with the etchback method employing a resist. These steps provide an improved polishing efficiency, a simplified process and a shortened polishing time.

According to this invention, the insulating layer 5 is formed from an inorganic oxide, and not an organic resin. In this regard, an organic resin will be so low in heat resistance that it is likely to be decomposed during heat treatment. It is also likely that an insulating layer of organic resin will become separated from the main pole and the substrate because of its higher coefficient of thermal expansion. Its low thermal conductivity interferes with the smooth dissipation of the heat which is generated when an electric current is applied to the coil, and thereby the use of a high input current. If an organic resin is exposed on a head surface facing a magnetic recording medium, it adheres to the surface of the medium and serious problems such as a head crash are likely to result. On the other hand, the use of an inorganic oxide makes it possible to avoid such problems and to provide an excellent thin-film magnetic head. A preferred inorganic oxide is, for example, $SiO_2$ or $Al_2O_3$.

The first and second main poles may be formed from an amorphous alloy containing cobalt or an iron alloy such as Sendust or Permalloy. The protective overcoat is preferably formed from $Al_2O_3$ or $SiO_2$.

The diamond polishing of the surface is preferably carried out by employing a diamond powder having a particle diameter not exceeding 1 $\mu$m, a lap base formed from Sn, Cu or cloth, a lap pressure of 0.01 to 1 kg/cm$^2$ and a rotating speed of 10 to 100 m/min.

The mechanochemical polishing of the surfaces is preferably carried out by employing a suspension containing in pure water 0.5 to 20% by weight of a fine powder of MgO, $ZrO_2$, $Al_2O_3$ or $SiO_2$ having a particle diameter not exceeding 0.1 $\mu$m or a mixture thereof, and a disk polisher rotatably disposed in the suspension. The polisher comprises a disk of, for example, hard cloth, solder or tin. The material to be polished is placed in the suspension and brought into contact with the polishing surface of the disk and they are rotated relative to each other. The appropriate material of the polisher, the appropriate rotating speed and the appropriate lap pressure will depend on the particle diameter of the powder used, the amount of the powder in the suspension and the material to be polished. A lap pressure of 0.01 to 1 kg/cm$^2$ and a rotating speed of 10 to 100 m/min. are usually preferred. The use of any powder having a particle diameter exceeding 0.1 μm should be avoided, as it is likely to scratch the surface to be polished.

The thin-film conductor coil may be formed by customary methods, such as sputtering, vapor deposition or plating. The insulating layer can also be formed by customary methods, such as sputtering or vapor deposition. The main poles can be formed by sputtering, vapor deposition or plating. The protective overcoat can also be formed by customary methods, such as sputtering or vapor deposition.

The via hole can be formed by a customary ion beam or chemical etching method. Another useful method of forming a via hole employs copper plating. In this technique a thick and inverted frustoconical layer of copper is formed by plating on the magnetic substrate on which the coil has been formed. After an insulating layer has been formed, its surface is ground to expose the copper layer and the copper layer is removed by etching to provide a via hole.

The thin-film head of this invention may include a single thin-film conductor coil layer or a plurality of coil layers. The protective overcoat may have a large thickness depending on the purpose for which the head will be used.

The invention will now be described more specifically by way of an example.

EXAMPLE

A thin-film, perpendicular magnetic recording and reproducing head was prepared by the process shown in FIGS. 1a–1h. Its magnetic substrate was formed from Ni-Zn ferrite. After grooves were formed in the Ni-Zn ferrite and then filled with glass, the principal surface of the so-formed substrate was polished mechanochemically and a thin-film conductor coil was formed on the polished surface by copper sputtering. An insulating layer of SiO$_2$ was formed by sputtering on the conductor coil and the principal surface of the magnetic substrate, and its surface was polished with a diamond powder to a roughness not exceeding 500 Å. Its diamond polishing was performed under the following conditions:

Diameter of diamond particles: 1 μm
Lap pressure: 0.1 kg/cm$^2$
Rotating speed: 50 m/min.
Lap base: Tin A via hole was formed in the insulating layer by ion beam etching. The surface of the insulating layer and the exposed surface of the substrate were polished mechanochemically under the following conditions to a roughness not exceeding 30 Å:

Suspension: Containing in pure water SiO$_2$ powder having a particle diameter of 100 Å
Lap pressure: 0.1 kg/cm$^2$
Rotating speed: 50 m/min.
Lap base: Hard cloth A first main pole of amorphous cobalt was formed by sputtering on the mechanochemically polished surfaces and a second, thick-film main pole of amorphous cobalt alloy was formed thereon by sputtering. A protective overcoat of Al$_2$O$_3$ was then formed thereon.

The thin-film magnetic head of the present invention has the exposed end face opposite the magnetic recording medium, the end face being composed of the magnetic substrate, the glass layer, the insulating layer, the first main pole and the protective overcoat.

A comparative thin-film head was prepared by the same process, except that its insulating layer was flattened by the etchback method using a resist. The insulating layer had a surface roughness of about 1500 Å.

Figure 2:
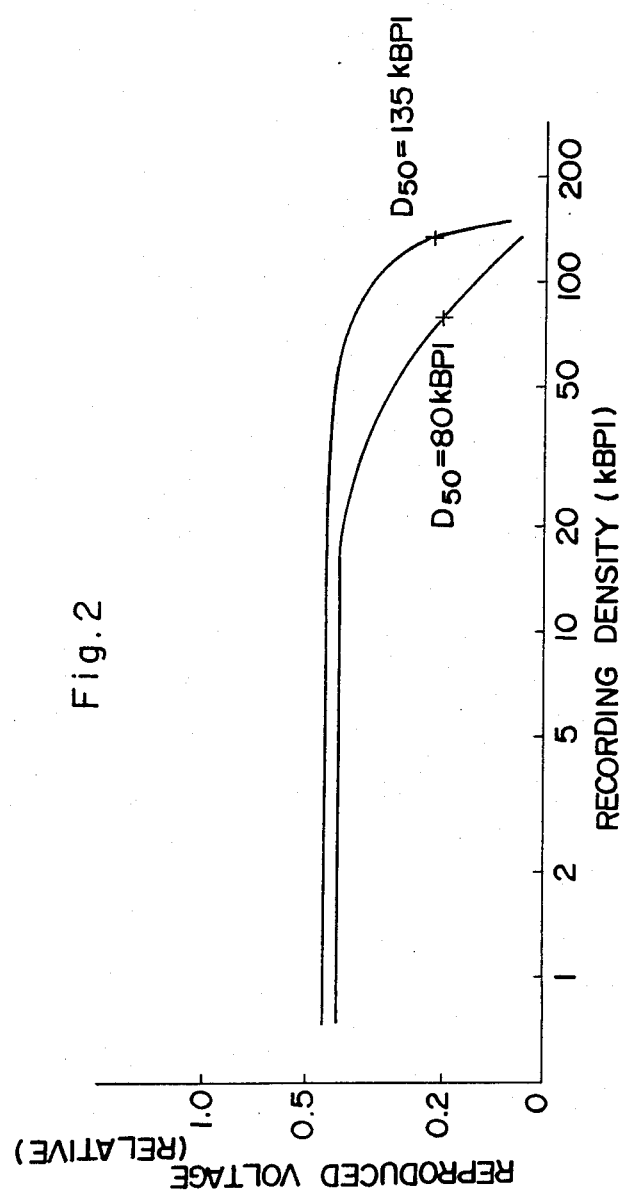
FIG. 2 is a graph showing the relative output vs. recording density of the magnetic head according to this invention, as compared with a conventional head.

The magnetic properties of the heads were compared. The results are shown in FIG. 2. As is obvious therefrom, the head of this invention having a finely polished surface showed a recording density D$_{50}$ which was 1.7 times higher than that of the comparative head.

What is claimed is:

1. A thin-film, perpendicular magnetic recording and reproducing head comprising:
   a magnetic substrate which comprises (a) a base element that is composed of a magnetic material and defines a primary surface having grooves therein and an end surface that is perpendicular to said primary surface, and (b) a nonmagnetic material in said grooves, said primary surface and the nonmagnetic material in said grooves of said magnetic substrate forming a smooth principal surface of said magnetic substrate as a result of mechanochemical polishing, said end surface of said magnetic substrate being adapted to face a magnetic recording medium;
   a thin-film conductor coil located on said polished principal surface of said magnetic substrate;
   an insulating layer of an inorganic oxide covering said magnetic substrate and said conductor coil, said insulating layer having surface opposite said magnetic substrate which has been flattened by polishing with a diamond powder, said insulating material also including a via hole formed therein which extends to said principal surface of said magnetic substrate to expose a surface portion of said principal surface of said magnetic substrate, the surface of said insulating layer and the exposed surface portion of said magnetic substrate having been also mechanochemically polished;
   a first main pole located on said polished surface of said insulating layer and said polished surface portion of said magnetic substrate; and
   a protective overcoat covering said first main pole.

2. A thin-film, perpendicular magnetic recording and reproducing head as set forth in claim 1, further including a second, thick-film main pole located between said first main pole and said protective overcoat.

3. A thin-film, perpendicular magnetic recording and reproducing head as set forth in claim 2, wherein said first main pole and said second, thick-film main pole are each formed from a material selected from the group consisting of Permalloy, Sendust, other iron alloys and amorphous cobalt alloys.

4. A thin-film, perpendicular magnetic recording and reproducing head as set forth in claim 2, wherein said first main pole and said second, thick-film main pole are each formed by sputtering, vapor deposition, or plating.

5. A thin-film, perpendicular magnetic recording and reproducing head as set forth in claim 1, wherein said magnetic material is Ni-Zn ferrite.

6. A thin-film, perpendicular magnetic recording and reproducing head as set forth in claim 1, wherein said magnetic material is Mn-Zn ferrite, and wherein an additional insulating layer is provided between said magnetic substrate and said conductor coil.

7. A thin-film, perpendicular magnetic recording and reproducing head as set forth in claim 6, wherein said insulating layer covering said conductor coil, said additional insulating layer provided between said magnetic substrate and said conductor coil, and said overcoat are each composed of inorganic oxides.

8. A thin-film, perpendicular magnetic recording and reproducing head as set forth in claim 7, wherein said insulating layers and said overcoat are each formed by sputtering or vapor deposition.

9. A thin-film, perpendicular magnetic recording and reproducing head as set forth in claim 1, wherein said nonmagnetic material is selected from the group consisting of glass, $SiO_2$, $Al_2O_3$ and barium titanate.

10. A thin-film, perpendicular magnetic recording and reproducing head as set forth in claim 1, wherein said conductor coil is formed from an electrically-conductive metal.

11. A thin-film, perpendicular magnetic recording and reproducing head as set forth in claim 10, wherein said conductor coil is formed by sputtering, vapor deposition, or plating.

12. A thin-film, perpendicular magnetic recording and reproducing head as set forth in claim 1, wherein said via hole is formed by an ion beam or chemical etching method.

13. A thin-film, perpendicular magnetic recording and reproducing head as set forth in claim 12, wherein said maximum roughness is 40 Å.

14. A thin-film, perpendicular magnetic recording and reproducing head as set forth in claim 1, wherein each of said mechanochemically polished surfaces is a distortion-free surface having a maximum roughness of 100 Å.

15. A thin-film, perpendicular magnetic recording and reproducing head as set forth in claim 1, wherein said via hole is formed by a method which comprises forming a thick and inverted frustoconical plated layer of copper on said magnetic substrate on which said conductor coil has been formed, forming said insulating layer so that it covers said copper, grinding said insulating layer to expose said copper, and removing said copper by etching.

16. A thin-film, perpendicular magnetic recording and reproducing magnetic head as set forth in claim 1, wherein the surface of said insulating layer opposite said magnetic substrate has been polished with a diamond powder having a maximum particle diameter of 1 μm using a rotating member having a lap base formed from tin, copper or cloth, a lap pressure of 0.01 to 1 kg/cm$^2$ and a rotating speed of 10 to 100 m/min.

17. A thin-film, perpendicular magnetic recording and reproducing head as set forth in claim 1, wherein said mechanochemically polished surfaces are each formed by employing a disk polisher formed from hard cloth, solder or tin and diposed rotatably in a suspension containing in pure water 0.5 to 20% by weight of a fine powder of MgO, $ZrO_2$, $Al_2O_3$ or $SiO_2$ having a maximum particle diameter of 0.1 μm or a mixture thereof, and bringing the surface to be polished into contact with the surface of said polisher at a lap pressure of 0.01 to 1 kg/cm$^2$ and a rotating speed of 10to 100 m/min.

18. A thin-film, perpendicular magnetic recording and reproducing head as set forth in claim 1, wherein said conductor coil consists of at least one layer.

19. A thin-film, perpendicular magnetic recording and reproducing head which displays a high recording density and a high reproducing output over a high frequency range which is formed by the steps of
 (1) providing a magnetic substrate which comprises (a) a base element that is composed of a magnetic material and defines a primary surface having grooves therein and an end surface that is perpendicular to said primary surface, and (b) a nonmagnetic material in said grooves, said primary surface and the nonmagnetic material in said grooves of said magnetic substrate forming a principal surface of said magnetic substrate, said end surface of said magnetic substrate being adapted to face a magnetic recording medium;
 (2) mechanochemically polishing the principal surface of said magnetic substrate,
 (3) forming a thin-film conductor coil on said mechanochemically polished principal surface of said magnetic substrate,
 (4) forming an insulating layer of an inorganic oxide on said mechanochemically polished principal surface of said magnetic substrate and said conductor coil thereon, said formed inorganic oxide insulating layer having an exposed surface which is uneven,
 (5) polishing said exposed surface of said insulating layer with a diamond powder to flatten said exposed surface to a roughness not exceeding 500 Å,
 (6) forming a via hole in said insulating layer which extends from said exposed surface of said insulating layer to said principal surface of said magnetic substrate so as to expose a surface portion of said principal surface of said magnetic substrate,
 (7) mechanochemically polishing the exposed surface of said insulating layer and said exposed surface portion of said magnetic substrate to a surface roughness not exceeding 100 Å,
 (8) forming a first main pole on the mechanochemically polished surface of said insulating layer and said mechanochemically polished surface portion of said magnetic substrate obtained in step (7),
 (9) forming a second, thick-film main pole on said first main pole, and
 (10) forming a protective coating over said second, thick-film main pole.

20. A method of forming a thin film, perpendicular magnetic recording and reproducing head which displays a high recording density and a high reproducing output over a high frequency range which is formed by the steps of
 (1) providing a magnetic substrate which comprises (a) a base element that is composed of a magnetic material and defines a primary surface having grooves therein and an end surface that is perpendicular to said primary surface, and (b) a nonmagnetic material in said grooves, said primary surface and the nonmagnetic material in said grooves of said magnetic substrate forming a principal surface of said magnetic substrate, said end surface of said magnetic substrate being adapted to face a magnetic recording medium;
 (2) mechanochemically polishing the principal surface of said magnetic substrate,
 (3) forming a thin-film conductor coil on said mechanochemically polished principal surface of said magnetic substrate,
 (4) forming an insulating layer of an inorganic oxide on said mechanochemically polished principal surface of said magnetic substrate and said conductor coil thereon, said formed inorganic oxide insulating layer having an exposed surface which is uneven, (5) polishing said exposed surface of said insulating layer with a diamond powder to flatten said exposed surface to a roughness not exceeding 500 Å, (6) forming a via hole in said insulating layer which extends from said exposed surface of said insulating layer to said principal surface of said magnetic substrate so as to expose a surface portion of said principal surface of said magnetic substrate, (7) mechanochemically polishing the exposed surface of said insulating layer and said exposed surface portion of said magnetic substrate to a surface roughness not exceeding 100 Å, (8) forming a first main pole on the mechanochemically polished surface of said insulating layer and said mechanochemically polished surface portion of said magnetic substrate obtained in step (7), (9) forming a second, thick-film main pole on said first main pole, and

(10) forming a protective coating over said second, thick-film main pole.

* * * * *